United States Patent
Browne et al.

(10) Patent No.: US 7,774,235 B2
(45) Date of Patent: Aug. 10, 2010

(54) METHOD AND PROCESS FOR PRODUCING A SEQUENCE OF DATA REQUEST USER INTERFACES

(75) Inventors: David Browne, Seattle, WA (US); Vishal Srivastava, Seattle, WA (US); Eric P. Lippke, Woodinville, WA (US); Anil Kumar Goel, Bellevue, WA (US)

(73) Assignee: RealNetworks, Inc., Seattle, WA (US)

( * ) Notice: Subject to any disclaimer, the term of this patent is extended or adjusted under 35 U.S.C. 154(b) by 1778 days.

(21) Appl. No.: 10/425,562

(22) Filed: Apr. 29, 2003

(65) Prior Publication Data

US 2004/0230909 A1    Nov. 18, 2004

(51) Int. Cl.
*G06Q 30/00* (2006.01)

(52) U.S. Cl. .......................... 705/26; 705/27; 715/700; 709/217

(58) Field of Classification Search .................... 705/26, 705/27; 715/700; 709/217
See application file for complete search history.

(56) References Cited

U.S. PATENT DOCUMENTS

| | | | |
|---|---|---|---|
| 5,835,712 A * | 11/1998 | DuFresne | 709/203 |
| 6,484,149 B1 * | 11/2002 | Jammes et al. | 705/26 |
| 7,013,289 B2 * | 3/2006 | Horn et al. | 705/26 |
| 2002/0093537 A1 * | 7/2002 | Bocioned et al. | 345/777 |
| 2002/0165936 A1 * | 11/2002 | Alston et al. | 709/217 |
| 2004/0111327 A1 * | 6/2004 | Kidd et al. | 705/26 |

* cited by examiner

*Primary Examiner*—Vanel Frenel
(74) *Attorney, Agent, or Firm*—Kory D. Christensen; Stoel Rives LLP (57) ABSTRACT

Method and apparatus, including computer program products, for producing a sequence of data request user interfaces that are rendered on a display, including receiving a request for a data request user interface included in the sequence of data request user interfaces, receiving data from a file for constructing the data request user interface, constructing the data request user interface, which when displayed the constructed data request user interface includes a step of the user activity, receiving a request based on the first data request user interface for another data request user interface included in the sequence of data request user interfaces, receiving data from the file for constructing the other data request user interface, and constructing the other data request user interface detached from the first data request user interface, which when displayed the constructed other data request user interface includes another step of the user activity.

17 Claims, 3 Drawing Sheets

METHOD AND PROCESS FOR PRODUCING A SEQUENCE OF DATA REQUEST USER INTERFACES

BACKGROUND

This application relates to producing a sequence of data request user interfaces, such as web pages.

Interfaces are often used to request data from a computer user. One type of interface used to request data is a web page. Web pages are typically displayed on a web browser program (e.g., Microsoft Explorer, Netscape Navigator, etc.) that is executed on a computer system to provide a user access to information (e.g., text, graphics, etc.) displayed on the web pages that covers a wide range of subjects. To allow the user to navigate among different web pages, data included in some web pages link to one or more different web pages that are typically related. By using the included data, the web browser allows the user to navigate among the web pages and view more information. Besides assisting the user to navigate (e.g. move forward) to view related web pages, the data is also used by the web browser to allow the user to step back through previously displayed web pages. Thus, if the user is interested in reviewing a previously displayed web page, the user can use to the web browser to retrace his or her steps to the desired web page. After reviewing the web page, the user can then return by stepping forward through the web pages.

SUMMARY

According to an aspect of this invention, a method of producing a sequence of data request user interfaces that are rendered on a display includes receiving a request for a first data request user interface included in the sequence of data request user interfaces, receiving data from a file for constructing the first data request user interface, constructing the first data request user interface, which when displayed the constructed first data request user interface includes a step of user activity, receiving a request for a second data request user interface included in the sequence of data request user interfaces, the request for the second data request user interface being based on the first data request user interface, receiving data from the file for constructing the second data request user interface, and constructing the second data request user interface detached from the first data request user interface, which when displayed the constructed second data request user interface includes another step of the user activity.

The above-described method may also be implemented as a process or as an apparatus, including computer program products.

One or more of the following advantages may be provided from the invention.

By producing a sequence of web pages without linking the individual web pages, the web pages remain isolated from each other and the sequence of web pages can be rapidly produced since the individual web pages are not edited to include data for linking each web page to the next corresponding web page in the sequence. Along with increasing production of the web page sequences, by not altering the content of the web pages, web page use is more flexible along with the sequences produced from the web pages. Further, by not inserting data to link the web pages for producing a sequence, a particular web page can be displayed without stepping through the one or more web pages that are sequentially positioned before or after the particular web page. Additionally, by applying a common stylistic feature to a sequence of web pages, such as displaying text included in each web page in a particular language, a user can quickly alter the appearance of a sequence without wasting time to alter the style or content of each individual web page in the sequence. By relatively quickly altering stylistic features, a user can develop a sequence of web pages for an intended audience such as a particular group of customers. Further, the particular stylistic features applied to a sequence web pages can be tailored to a particular platform (e.g., desktop computer, laptop computer, etc.) for displaying the sequence.

Other features will be apparent from the following description, including the drawings, and the claims.

DETAILED DESCRIPTION

Figure 1:
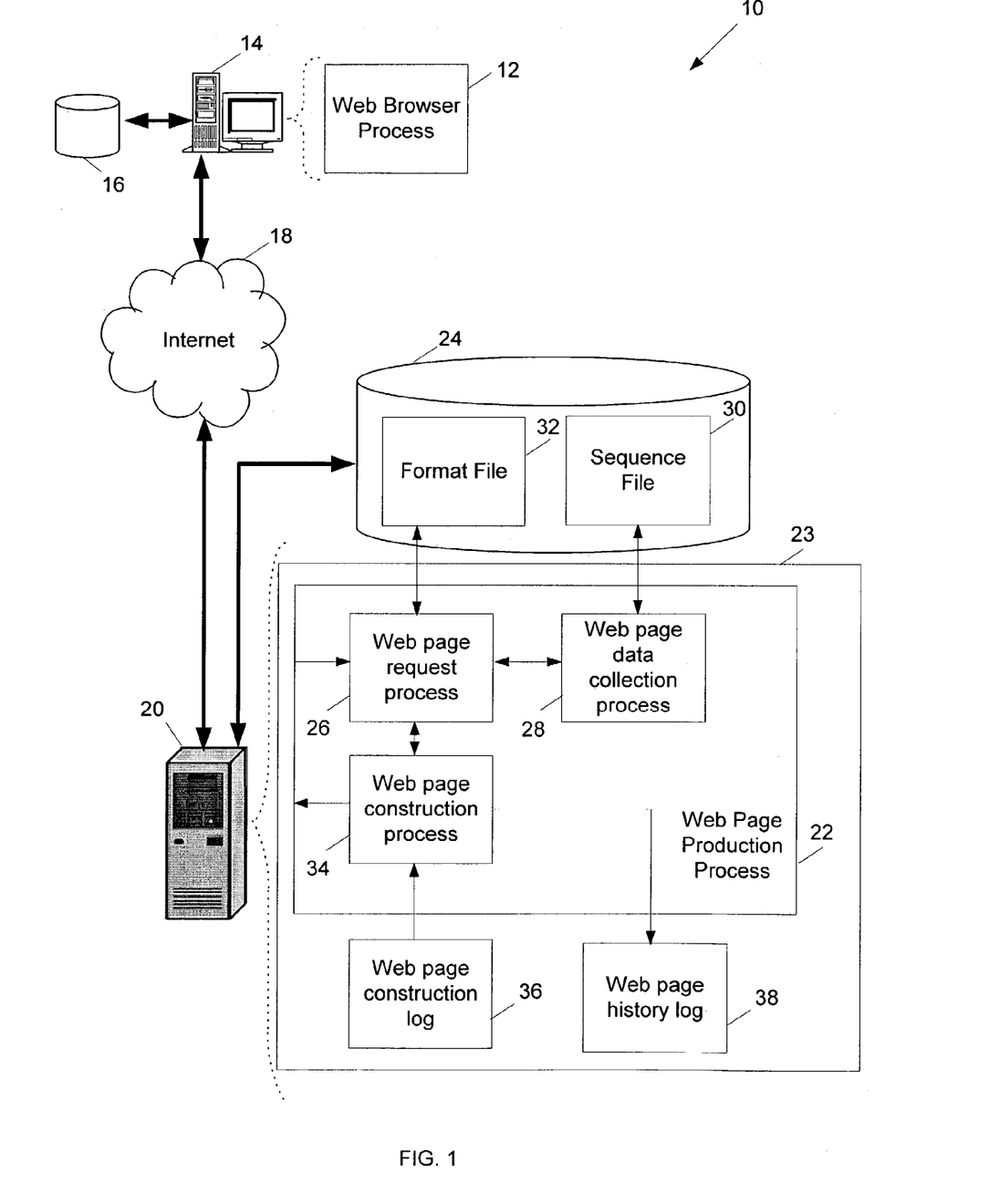
FIG. 1 is a block diagram depicting a computer network for displaying sequences of web pages.

Referring to FIG. 1, a computer network 10 includes a web browser process 12 (e.g., Microsoft Explorer, Netscape Navigator, etc.) that is executed by a client computer system 14 and is stored on a storage device 16 (e.g., hard drive, CD-ROM, etc.) that is in communication with the client computer system. The client computer system 14 is also in communication through the Internet 18, or other similar communication system (e.g., a local area network, a wide area network, an intranet, etc.), to a server 20 that executes a web page production process 22 that is stored on a storage device 24 (e.g., hard drive, CD-ROM, etc.) that is in communication with the server. In general, the web browser process 12 provides a user with a capability of viewing web sites that include one or more web pages for conveying information. For example, the web browser 12 can display a web site associated with a particular corporation (e.g., manufacturer, distributor, retailer, etc.) so that the user can study the web pages associated with the web site to learn about products sold by the corporation and then purchase one or more of the products. To view a particular web site, and the associated web pages, the user typically enters into the web browser process 12 an address in hypertext markup language (HTML), or other similar language, to identify the web site and to direct the server 20 to transmit the web pages associated with the web site to the client computer system 14 for display. After the user views the products, on one or more web pages, the user may decide to purchase one or more of the products and request a purchase through the web browser process 12. In some arrangements to execute such a purchase, the server 20 transmits a sequence of web pages to the client computer system 14 to step the user through a procedure to purchase the product of interest. However, in some arrangements the server 20 transmits a sequence of data request user interfaces, which includes a sequence of web pages, such as a sequence of graphical user interfaces or other similar user interfaces for requesting data. Specifically, in some arrangements, the steps associated with the web page sequence include requesting the user identify the product, enter a billing address, enter a credit card number, and then confirm the purchase for execution. However, in other arrangements more or less steps are needed for a purchase. Further, besides purchasing products, in some arrangements the sequence of web pages sent to the client computer system 14 is used to guide the user through other order flows such as purchasing one or more services, registering for future orders (e.g., a bridal registry), being refunded for past orders, registering on a mailing list, or other similar order flows. In some arrangements the order flow includes a series of steps to execute other financial transactions such as producing and filing a tax return. Also, in some arrangements the sequence of web pages can guide the user through a series of steps associated with other activities such as providing the user training exercises, registering the user on a web site, presenting slide presentations, providing educational lectures, or other similar activities.

Alternatively to receiving a request from the user, in some arrangements a request is initiated from a monitoring process (not shown) that is resident in memory 23 of the server 20 and executes in the background. In some arrangements the monitoring process detects if a particular event occurs and initiates a request based on the detected event. For example, if a valid credit card number is entered by the user, but the monitoring process determines that the credit card account is currently being blocked from executing new purchases, a request is initiated to produce and display a sequence of web pages to the user for addressing the credit card account problem. In another example, the monitoring process detects errors associated with the internal or external operations of the server 20, the client computer system 14, or another portion of the computer network 10 and initiates a request for a sequence of web pages to address the detected error.

In this particular product-purchasing example, after receiving the user request for a purchase, the server 20 directs the request to the web page production process 22. The web page production process 22 provides each individual web page in the purchasing sequence to the server 20 that transmits each web page in the sequence to the client computer system 20 so the user can interact with each respective web page and step through the purchasing procedure. The web page production process 22 individually produces and sends each web page in the sequence to the server 20 such that each web page is individually received by the server 20 for transmission to the web browser process 12. By individually producing each web page in an isolated fashion, the web pages are detached for each other and the content of the web pages is not edited to link the web pages in a series for displaying as a sequence. Additionally, the web page production process 22 determines which web pages to include in the web page sequence and the order of the web pages in the sequence on a page-by-page basis and in some arrangements uses information entered by the user for this purpose. For example, data entered by the user into one particular web page can be used by the web page production process 22 to determine which web page to send next from the server 20 to the client computer system 14. Further the web page production process 22 can track data entered by the user into more than one displayed web page and use that data to determine the next web page or sequence of web pages to be displayed on the web browser process 12. In some arrangements, the web page production process 22, or one or more processes included in the web page production process, is a servlet, a java class, a java server page (JSP), or other similar program such as a java program that executes on the server 20.

When producing each web page, the web page production process 22 determines a particular format to apply to the content of each web page in a sequence of web pages. For example, the format applied to each web page includes the particular language (e.g., English, Spanish, etc.), graphics (e.g., background color, highlights images, animation, audio or visual alerts, font, etc.), or other similar format types to develop a theme across the sequence of web pages. In some arrangements the format applied to the web pages depends upon the type of platform used to display the web pages. For example, a particular web page to be displayed on the client computer system 14 may include numerous input fields for the user to enter data. Alternatively, in some arrangements for the user to enter the data, the server 20 delivers a sequence of web pages to a wireless device such as a personal digital assistant (PDA), a cellular phone, or other similar device that includes a display screen that is smaller than the display of the client computer system 14. In such arrangements, the numerous input fields are be distributed across a sequence of two or more displays on the smaller screens so the user can easily understand the particular data to be entered.

Upon receiving a user request to initiate a purchase, the server 20 passes the request to a web page request process 26 that is included in the web page production process 22. The web page request process 26 identifies the request and requests that a web page data collection process 28, which is also included in the web page production process 22, identify the particular sequence of web pages to send to the web browser 14 to step the user through the purchasing procedure. Based on the request, the web page data collection process 28 provides the web page request process 26 with the identity of the first web page of the sequence. After the first web page is sent from the server 20 to the client computer system 14, the web page request process 26 requests the web page data collection process 28 identify the next web page in the sequence. In some arrangements each web page is identified by an assigned name. Alternatively in some arrangements a web page is identified by the data and processes used for constructing the web page.

Upon receiving the request to identify a sequence of web pages, or a request to identify the next web page in the sequence of web pages, the web page data collection process 28 retrieves data from a sequence file 30 stored on the storage device 24 or another storage device (not shown) that is in communication with the server 20 by direct connection (e.g., a serial cable) or through the Internet 18. In some arrangements the sequence file 30 is an Extensible Markup Language (XML) file, a Wireless Markup Language (WML) file, or other similar file type that includes data identifying web page sequences and each individual web page in a respective sequence such as the web page sequence for purchasing a product. By producing the web page sequence based on the data included in the sequence file 30, sequences of web pages are produced relatively quickly and efficiently without editing or altering individual web pages to link the web pages into a series. Also, by not linking the individual web pages into a series, the web page production process 22 can restrict the user from accessing web pages simply by stepping backward and forward through the series of web pages. Since the web page production process 22 provides unlinked web pages, the user is not provided with links connecting the web pages and the user needs to initiate a request to the web page production process 22 to access previously displayed web pages included in the sequence. Further, in some arrangements the sequence file 30 includes multiple web page sequences to provide different sequences of web pages based on the user initiated request from the web browser process 12.

Along with identifying each web page, the sequence file 30 also has one or more prerequisite conditions associated with some of the web pages in the purchasing sequence. Prior to displaying each web page included in the sequence, any prerequisite condition associated with the respective web page needs to be met. If the prerequisite condition is not met, the web page production process 22 blocks the transmission of the associated web page from the server 20 to the client computer 14. Additionally, if one or more prerequisite conditions are not met, the web page production process 22 alters the sequence of web pages sent to the web browser process 12 so that the unmet prerequisite conditions are satisfied. Typically if one or more prerequisite conditions associated with a web page are not met, the web page production process 22 produces another sequence of web pages, which includes one or more web pages, which are transmitted to the web browser process 12 for user interactions (e.g., data entry) to satisfy the unmet prerequisite conditions.

In some arrangements the sequence file 30 also includes post-requisite conditions associated with one or more web pages in the purchasing sequence or other activity. After displaying a particular web page associated with a post-requisite condition, the post-requisite condition needs to be met to stop the displaying of the web page and progressing in the purchasing sequence to the next web page. Further in some arrangements the post-requisite condition associated with one web page functions as the prerequisite condition of the next web page in the web page sequence.

Figure 2:
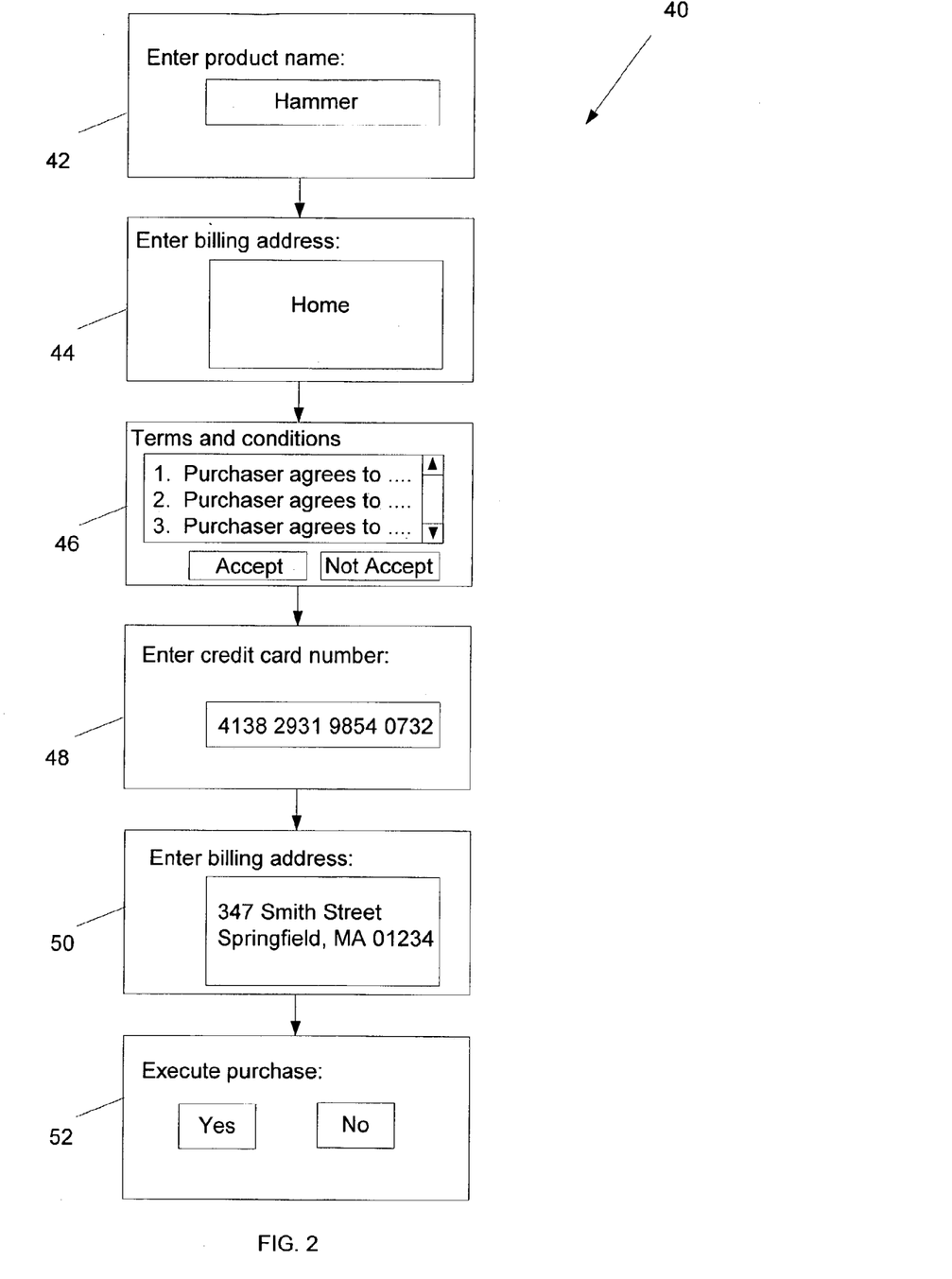
FIG. 2 is a series of diagrams pictorially depicting a sequence of web pages.

Referring to FIG. 2, a sequence of web pages 40 are displayed as a demonstrative example of the steps for purchasing a product with web pages provided by the web page production process 22 (shown in FIG. 1) along with altering the sequence to satisfy an unmet prerequisite condition. Web page 42 starts the purchasing procedure by requesting that the user identify the product to be purchased by entering the product's name (e.g., a hammer) in an input field included in the web page. After the entering the product name, the name is sent to the server 20 (shown in FIG. 1) and the next web page 44 in the sequence 40 is displayed and requests the user enter a billing address for purchasing the named product. In this particular example, the user erroneously enters the term "home" instead of an actual address for billing. Again, once this billing address is entered, it is sent to the server 20 (shown in FIG. 1). After this erroneous entry in web page 44, web page 46 is sent from the server 20 and displayed to the user on the web browser process 12 (shown in FIG. 1). This particular web page 46 includes the terms and conditions that apply to the purchase. After reviewing the terms and conditions the user either selects the "Accept" button, included on the web page 46, and continue the steps for purchasing the named product, or selects the "Not Accept" button, also included on the web page 46, and terminates the purchase. For this particular example, the user selects to accept the terms and conditions and data identifying that selection is sent to the server 20 (shown in FIG. 1). After agreeing to the terms and conditions, the web browser process 12 (shown in FIG. 1) receives web page 48 and displays it to the user. Web page 48 requests that the user enter a credit card number for the purchasing of the selected product. Accordingly, the user enters a credit card number (e.g., 4138 2931 0732) that is sent to the server 20 (shown in FIG. 1).

As web page 48 is displayed to the user, the web page production process 22 (shown in FIG. 1) is informed by the server 20 of the web page currently displayed to the user and determines the next web page to be sent to the web browser process 12 (shown in FIG. 1) by accessing the sequence file 30 (shown in FIG. 1). In this particular example, the next web page 52 in the sequence is displayed to confirm the purchase. However, the web page production process 22 (shown in FIG. 1) also determines that prerequisite conditions associated with the web page 52 need to be met prior to displaying that particular web page. In this example, the prerequisite conditions require that the user provide an appropriate billing address (e.g., a street address, town, state, etc.), accept the terms and conditions of the purchase, and provide an appropriate credit card number (e.g., correct number of digits, a valid associated credit card carrier, etc.). In this example, while the user did accept the terms and conditions and enter an appropriate credit card number, the entered billing address is inappropriate. So prior to displaying the web page 52 to confirm the purchase, the web page production process 22 (shown in FIG. 1) produces the appropriate one or more pages to satisfy this unsatisfied prerequisite condition. In this example, only one prerequisite condition needs to be satisfied (i.e., an appropriate billing address). So the next web page 50 produced and displayed requests that the user enter an appropriate billing address. In this particular example, web page 50 is the web page 42 re-displayed. However, in some arrangements format (e.g., highlighting) or content changes are used to draw the user's attention and alert the user to the previous data entry error. Additionally, since the web page production process 22 individually produces each web page, the web page 50 is produced and sent to the web browser process 12 without stepping back through the previous web pages (i.e., web page 48 and 46) to re-display web page 44.

In this particular example, the user entered an appropriate billing address into web page 50 and this billing address is sent to the server 20 (shown in FIG. 1). Once the server 20 receives the billing address, the web page production process 22 (shown in FIG. 1) determines that the three prerequisite conditions are satisfied and web page 52 is produced and sent to the web browser process 12 for displaying to the user. Again, since each web page is individually produced, the web page production process 22 does not step through previously displayed web pages (e.g., web page 46 and 48) between displaying web page 50 (i.e., re-displayed web page 44) and web page 52. In this example, to execute the purchase the user selects the button labeled "yes" included in web page 52 and data is sent to the server 20 (shown in FIG. 1) to execute and complete the purchase.

Referring back to FIG. 1, along with prerequisite conditions and the identities of the particular web pages to be produced by the web page production process 22, the web page data collection process 28 retrieves processes from the sequence file 30 to construct the respective web page and also retrieves processes that execute while the web page is displayed. For example, if web page 44 (shown in FIG. 2) is to display next, the web page data collection process 28 retrieves one or more processes from the sequence file 30 for receiving a billing address entered by the user into the client computer system 14 as the web page 44 is displayed on the web browser process 12. In another example, if web page 48 (also shown in FIG. 2) is to be displayed next, the web page data collection process 28 retrieves from the sequence file 30 one or more processes for receiving a credit card number entered by the user into the client computer 14 as the web page 48 is displayed on the web browser 12. Processes used in constructing the next web page to be displayed are retrieved from the sequence file 30 such as processes used for displaying a particular piece of information on the next web page to be displayed. After the web page data collection process 28 retrieves data identifying the next web page, any associated prerequisite conditions, and processes associated with the next web page, the data, prerequisite conditions, and processes are transferred to the web page request process 26 for constructing the next web page. Additionally, the web page request process 26 retrieves data from a format file 32 that is stored in this particular arrangement on the storage device 24. The data received from the format file 32, which in some arrangements is an XML file, contains information used to apply stylistic features to the web page under construction. For example, the format file 32 provides the language, graphical style, and other similar stylistic features for each web page in the sequence. However, in some arrangements the data associated with the stylistic features is provided from an application program through an application program interface (API), or from the particular platform that the web pages are to be displayed. After the web page request process 26 receives data from the format file 32, along with the data from the sequence file 30, from the web page data collection process 28, the data is passed to a web page construction process 34 to construct the next web page to be sent from the server 20 to the client computer system 14.

Prior to constructing the web page for transmission to the client computer system 14, the web page construction process 34 determines if each of the prerequisite conditions associated with the web page under construction have been met by checking the data stored in a web page construction log 36 (e.g., a file) that is stored in memory 23 included in the server 20. The web page construction log 36 has the requested data entered by the user based on the previous and currently displayed web pages. By accessing this data the web page construction process 34 determines if each prerequisite condition associated with the web page under construction has or has not been satisfied.

For example, as show in FIG. 2, the billing address requested by web page 44, acceptance of the terms and conditions requested by web page 46, and the credit card number requested by web page 48 were entered by the user into the client computer system 14, transferred to the server 20, and stored in the web page construction log 36. So, prior to constructing the web page 52, the web page construction process 34 checks the web page construction log 36 to determine if the appropriate data is present for satisfying each prerequisite condition associated with web page 52 prior to constructing and displaying the web page. If the appropriate data is not present in the web page construction log 36 the web page 52 is not constructed by the web page construction process 36 and the construction process alerts the web page request process 26 that the next web page 50 to be displayed needs to be associated with collecting the appropriate data for satisfying the unmet prerequisite conditions. The web page request process 26 requests the web page data collection process 28 identify the web page 50 to collect the data. The web page data collection process 28 retrieves the appropriate data from the sequence file 30 and provides the identity, prerequisite conditions, and associated processes to construct the next appropriate web page 50 to the web page request process 26 which in turn passes the identity, prerequisite conditions, and associated processes to the web page construction process 34 along with format information collected from the format file 32. Once received the web page construction process 34 constructs the web page 50 and passes the web page to the server 20 for transmission of the web page to the client computer system 14 for the user to enter the appropriate data to satisfy the unmet prerequisite conditions of web page 52. After the user enters in the appropriate data (e.g., a correct billing address) the data is sent to the server 20 and stored on the web page construction log 36. Once the received data is stored in the web page construction data base 36, the web page construction process 34 informs the web page request process 26 that the appropriate data is present and the web page 52 associated with the unmet prerequisite conditions can now be constructed and sent to the client computer system 14. The web page request process 26 requests that the web page data collection process 28 provide the identity, prerequisite conditions (which are now satisfied), and associated processes to construct the web page 52. Upon receipt, the web page request process 26 sends the information along with format data received from the format file 32 to the web page construction process 34 to construct the web page 52. In some arrangements the web page construction process 34 constructs the web pages using framework architecture. In general, a framework collects and stitches one or more processes together to construct a web page such that the processes are reusable for constructing other web pages. In some arrangements, the web page construction process 34 uses a struts framework that is based on a Model-View-Controller (MVC) system. An MVC system consists of a "Model" where business logic resides, a "View" that is produced by java server pages (JSP's), and a "Controller" that is a servlet or a collection of servlets to provide centralized process handling. Alternatively, in some arrangements the web pages are constructed based on a framework that uses JSP's for each web page aspect.

After the web page 52 is constructed, or any other web page, the web page construction process 34 assigns an identification number to the web page 52 and the identification number is stored in a web page history log 38. By assigning and storing identification numbers for each web page constructed, the web page production process 22 can relatively quickly identify each web page sent to the web browser process 12 that is included in the web page sequence used for purchasing a product. Additionally, by storing each assigned identification number, the web browser production process 22 can use the identification number to re-construct a particular web page for displaying on the web browser process 12. So, if one or more prerequisite conditions are unmet, the web page construction process can quickly sort through the web page history log to determine which web page(s) should be reconstructed to satisfy the unmet conditions. After assigning and storing the identification number in the web page history log 38, the constructed web page 52 is passed to the server 20 for delivery to the client computer 14. The web page request process 26 then identifies this web page 52 to the web page data collection process 28 as the currently viewed web page on the client computer system 14 and requests the next particular web page in the web page sequence for displaying or the next web page to display if the sequence is completed.

Figure 3:
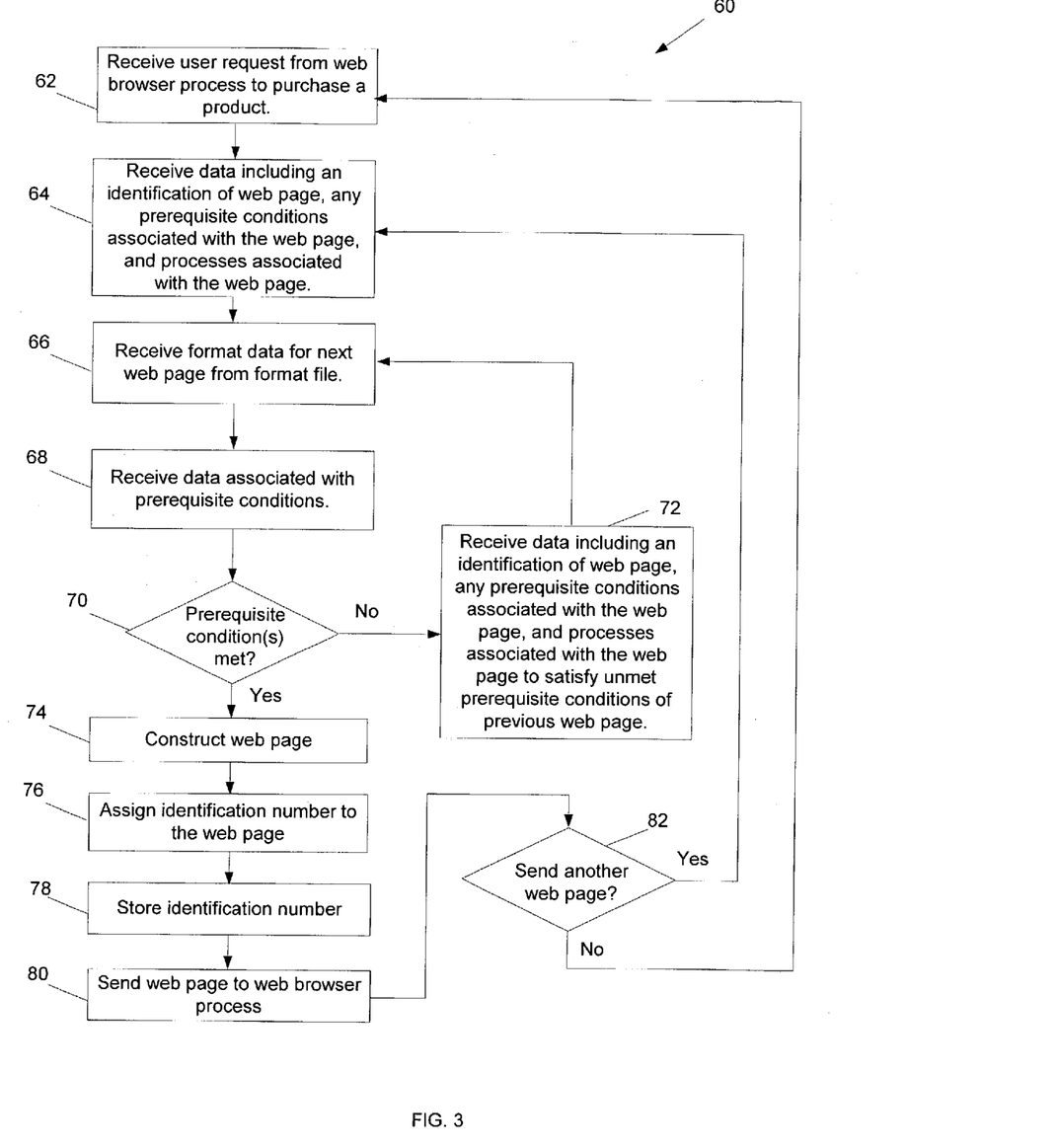
FIG. 3 is a flow chart of a web page production process.

Referring to FIG. 3, a web page production process 60 is shown. The web page production process 60 includes receiving (62) a user request to execute a particular activity (e.g., purchasing a product) through a web browser process, such as the web browser process 12 shown in FIG. 1. After receiving (62) the user request, the web page production process 60 receives (64) data that includes an identification of the web page to be sent to the web browser process, any prerequisite conditions associated with the web page, and processes associated with the web page (e.g., processes for constructing the web page, processes to execute while the web page is displayed, etc). In some arrangements, as shown in FIG. 1, this data is received from a sequence file 30 that is stored on a storage device such as storage device 24.

After receiving (64) the data, the web page production process 60 receives (66) format data for constructing the web page. In some arrangements, also shown in FIG. 1, format data is received from a format file such as the format file 32 stored on the storage device 24. Typically, the format data is used to determine the particular language used to display text on the web page, graphics to include on the web page, and other similar stylistic features associated with constructing the web page. After receiving (66) format data for constructing the web page, the web page production process 60 receives (68) data associated with the prerequisite conditions for determining if each condition is met. As shown in FIG. 1, in some arrangements this data is received from the web page construction log 36 that resides in memory 23 included in the server 20.

After receiving (68) the data, the web page production determines (70) if each prerequisite condition is met based on the received data. If determined that the prerequisite conditions are not met based on the received data, the web page production process 60 constructs a web page or a sequence of web pages for sending to the web browser process to collect the data needed to satisfy the unmet prerequisite conditions. To send this web page, or the first in a sequence of web pages, the web page production process 60 receives (72) data that includes an identification of the this next web page to send, any prerequisite conditions associated with the web page, and processes with the web page for collecting the data needed to satisfy the unmet prerequisite requirements of the previous web page.

After receiving (72) the data, the web page production process 60 returns to receive (66) format data, from the format file, associated with this web page. If determined that the prerequisite conditions are met by the received data, the web page production process 60 constructs (74) the web page using the format data and the received associated processes. After constructing (74) the web page, the web page production process 60 assigns (76) an identification number to the web page and stores (78) the identification number in a web page sequence history log such as the log 38 shown in FIG. 1. After assigning (76) and storing (78) the identification number, the web page production process 60 sends (80) the constructed web page to the web browser process for displaying and interacting with the user. After sending (80) the web page, the web page production process 60 determines (82) if another web page, such as the next web page in a sequence of web pages, is to be sent to the web browser process.

For example, in some arrangements if the user requested to purchase a product through the web browser process, a sequence of web pages are needed to step the user through the purchasing procedure. So, in such an example, the next web page in the sequence needs to be constructed and sent to the user. If determined that another web page is to be constructed and sent to the web browser process, the web page production process 60 returns to receive (64) the identification, prerequisite conditions, and processes associated with the next web page. If determined that no further web pages are to be constructed and sent to the web browser process, the web page production process 60 returns to receive (62) another user request through the web browser.

The processes described herein can be implemented in digital electronic circuitry, or in computer hardware, firmware, software, or in combinations of them. The processes described herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods can be performed by one or more programmable processors executing a computer program to perform functions of the invention by operating on input data and generating output. The method can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The processes described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The processes described herein can also be implemented in other electronic devices individually or in combination with a computer or computer system. For example, the processes can be implemented on mobile devices (e.g., cellular phones, personal digital assistants, etc.).

The invention has been described in terms of particular embodiments. Other embodiments are within the scope of the following claims. For example, the steps of the invention can be performed in a different order and still achieve desirable results.

What is claimed is:

1. A method comprising:
   accessing at a server, sequence data stored in a computer-readable storage medium, the sequence data configured to allow a user to perform a user activity comprising a plurality of steps, wherein the sequence data comprises data to, identify a plurality of unlinked data request user interfaces for inclusion in the sequence, define an order of the identified, unlinked data request user interfaces, and define conditions associated with one or more of the identified, unlinked data request user interfaces;

receiving at the server, a request from a user to perform the user activity;

constructing at the server, a first data request user interface in the sequence, wherein the first data request user interface is constructed without a link to another data request user interface, and wherein the constructed first data request user interface includes a step of the user activity;

transmitting the constructed first data request user interface to the user;

receiving at the server, a request for another data request user interface in the sequence of data request user interfaces from the user, wherein the request includes user interaction data provided by the user through the constructed first data request user interface;

constructing at the server, a next data request user interface in the sequence using, the user interaction data, the order of the identified, unlinked data request user interfaces, and a condition associated with one or more of the identified, unlinked data request user interfaces, wherein the next data request interface is constructed without a link to another data request user interface and includes another step of the user activity; and transmitting the constructed next data request user interface to the user.

2. The method of claim 1, further comprising receiving format data for constructing the first data request user interface, wherein the format data is stored separately from the sequence data.

3. The method of claim 1, wherein the user activity includes an order flow.

4. The method of claim 3, wherein the order flow includes purchasing a product.

5. The method of claim 1, wherein the first data request user interface includes a graphical user interface.

6. The method of claim 1, wherein the sequence data comprises a post-requisite condition for the first data request user interface.

7. The method of claim 6, wherein constructing the next data request user interface further comprises evaluating the post-requisite condition of the first data request user interface, and wherein the first data request user interface is constructed when the post-requisite condition is not satisfied.

8. The method of claim 1, wherein the sequence data comprises a prerequisite condition for a particular one of the identified, unlinked data request user interfaces.

9. The method of claim 8, wherein constructing the next data request user interface further comprises evaluating the prerequisite condition of the particular identified, unlinked data request user interface, and wherein the particular identified, unlinked data request user interface is constructed when the prerequisite condition thereof is satisfied.

10. A process comprising:

accessing at a server, a sequence data stored in a computer-readable storage medium, the sequence data configured to allow a user to perform a user activity, wherein the sequence data comprises data to, identify a plurality of unlinked data request user interfaces for inclusion in the sequence, define an order of the identified, unlinked data request user interfaces, and define conditions associated with one or more of the identified, unlinked data request user interfaces;

a first reception process for receiving at the server, a request from a user to perform the user activity;

a first construction process for constructing at the server the first data request user interface, wherein the constructed first data request user interface is constructed without a link to another data request user interface, and wherein the constructed first data request user interface includes a step of the user activity;

a first transmission process for transmitting the constructed first data request user interface to the user;

a third reception process for receiving a request for another data request user interface in the sequence of data request user interfaces, wherein the request includes user interaction data provided by the user through the constructed first data request user interface;

second construction process for constructing a next data request user interface using, the user interaction data, the order of the identified, unlinked data request user interfaces, and a condition associated with one or more of the identified, unlinked data request user interfaces, wherein the constructed next data request user interface is constructed without a link to another data request user interface and includes another step of the user activity; and a second transmission process for transmitting the constructed next data request user interface to the user.

11. The process of claim 10, further comprising a process to receive format data for constructing the first data request user interface, wherein the format data is stored separately from the sequence data.

12. The process of claim 10, wherein the user activity includes an order flow.

13. The process of claim 12, wherein the order flow includes purchasing a product.

14. An article comprising a machine-readable storage medium which stores executable instructions to cause a machine to:

access at a server, sequence data configured to allow a user to perform a user activity comprising a plurality of steps, the sequence data comprising data to, identify a plurality of unlinked data request user interfaces for inclusion in the sequence, define an order of the identified, unlinked data request user interfaces, and define conditions associated with one or more of the identified, unlinked data request user interfaces;

receive at a server, a request from a user to perform the user activity;

construct the first data request user interface, wherein the constructed first data request user interface is constructed without a link to another data request user interface, and wherein the constructed first data request user interface includes a step of the user activity;

transmit the constructed first data request user interface to the user;

receive at the server, a request for another data request user interface included in the sequence of data request user interfaces from the user, wherein the request includes user interaction data provided by the user through the constructed first user interface;

construct at the server, a next data request user interface in the sequence using, the user interaction data, the order of the identified, unlinked data request user interfaces, a post-requisite condition of the first data request user interface, and a prerequisite condition of one or more of the identified, unlinked data request user interfaces, wherein the next data request interface is constructed without a link to another data request user interface and includes another step of the user activity; and transmit the constructed next data request user interface to the user.

15. The article of claim 14, wherein storage medium further comprises executable instructions to cause the machine to receive format data for constructing the next data request user interface, wherein the format data is stored separately from the sequence data.

16. The article of claim 14, wherein the user activity includes an order flow.

17. The article of claim 16, wherein the order flow includes purchasing a product.

* * * * *